US008948030B2

(12) United States Patent
Frederiksen et al.

(10) Patent No.: US 8,948,030 B2
(45) Date of Patent: Feb. 3, 2015

(54) TRANSMITTING NODE B LOAD STATUS INFORMATION IN A SELF ORGANISING NETWORK

(75) Inventors: Frank Frederiksen, Klarup (DK); Klaus Ingemann Pedersen, Aalborg (DK); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 746 days.

(21) Appl. No.: 12/989,884

(22) PCT Filed: Apr. 30, 2008

(86) PCT No.: PCT/EP2008/055387
§ 371 (c)(1),
(2), (4) Date: Oct. 27, 2010

(87) PCT Pub. No.: WO2009/132709
PCT Pub. Date: Nov. 5, 2009

(65) Prior Publication Data
US 2011/0038431 A1 Feb. 17, 2011

(51) Int. Cl.
H04L 12/26 (2006.01)
H04W 24/02 (2009.01)
H04W 16/10 (2009.01)
H04W 84/04 (2009.01)
H04W 88/08 (2009.01)
H04W 92/20 (2009.01)

(52) U.S. Cl.
CPC .............. *H04W 24/02* (2013.01); *H04W 16/10* (2013.01); *H04W 84/045* (2013.01); *H04W 88/08* (2013.01); *H04W 92/20* (2013.01)

USPC .......................................................... 370/252

(58) Field of Classification Search
USPC ........................................... 455/453; 370/229
See application file for complete search history.

(56) References Cited

U.S. PATENT DOCUMENTS

| 6,597,988 | B1 * | 7/2003 | Brodie et al. ................. 701/469 |
| 6,873,609 | B1 * | 3/2005 | Jones et al. ................... 370/329 |
| 7,151,743 | B2 * | 12/2006 | Wahl et al. .................... 370/229 |
| 7,197,319 | B2 * | 3/2007 | Tiedemann et al. .......... 455/453 |
| 7,251,562 | B1 * | 7/2007 | Brodie et al. ................. 701/469 |
| 7,418,008 | B2 * | 8/2008 | Lotter et al. .................. 370/469 |
| 7,576,573 | B2 * | 8/2009 | Nguyen ......................... 327/100 |
| 7,649,890 | B2 * | 1/2010 | Mizutani et al. ......... 370/395.21 |

(Continued)

FOREIGN PATENT DOCUMENTS

RU    2122288 C1    2/2008
WO    WO 03/107184 A1    12/2003

OTHER PUBLICATIONS

Details on Load balancing and ICIC signaling Mechanism, NEC, Feb. 11, 2008.*

(Continued)

*Primary Examiner* — Hassan Kizou
*Assistant Examiner* — Abdullahi Ahmed
(74) *Attorney, Agent, or Firm* — Harrington & Smith

(57) ABSTRACT

The application relates to wireless transmission of load status information for load balancing among Home Node Bs (HNB) or Local Area Node Bs (LNB) for which an X2 interface is not available. In particular, an LNB may pretend to be a user equipment with a specific predefined user equipment ID value. A neighboring LNB which receives a data packet with this user equipment ID value knows that the data packet contains load information monitored, by a neighboring LNB.

34 Claims, 3 Drawing Sheets

(56) References Cited

U.S. PATENT DOCUMENTS

| | | | |
|---|---|---|---|
| 7,778,151 B2* | 8/2010 | Bertrand et al. | 370/208 |
| 7,864,722 B2* | 1/2011 | Yi et al. | 370/312 |
| 7,940,701 B2* | 5/2011 | Kikuchi | 370/259 |
| 7,983,246 B2* | 7/2011 | Lee | 370/352 |
| 8,254,252 B2* | 8/2012 | Hinosugi et al. | 370/229 |
| 2004/0023652 A1 | 2/2004 | Shah et al. | 455/426.2 |
| 2005/0020299 A1* | 1/2005 | Malone et al. | 455/552.1 |
| 2006/0046724 A1* | 3/2006 | Ton et al. | 455/442 |
| 2006/0083159 A1* | 4/2006 | Laroia et al. | 370/208 |
| 2006/0171312 A1* | 8/2006 | Obuchi et al. | 370/229 |
| 2007/0153754 A1 | 7/2007 | Shapira et al. | 370/338 |
| 2007/0249352 A1* | 10/2007 | Song et al. | 455/436 |
| 2007/0293203 A1* | 12/2007 | Usuda et al. | 455/414.3 |
| 2008/0004033 A1 | 1/2008 | Tiedemann et al. | 455/453 |
| 2009/0247168 A1* | 10/2009 | Morimoto et al. | 455/437 |
| 2010/0195587 A1* | 8/2010 | Ratasuk et al. | 370/329 |
| 2010/0285790 A1* | 11/2010 | Baliosian et al. | 455/422.1 |
| 2010/0296464 A1* | 11/2010 | Barraclough et al. | 370/329 |
| 2010/0309881 A1* | 12/2010 | Kim et al. | 370/331 |
| 2011/0013523 A1* | 1/2011 | Ding et al. | 370/242 |
| 2011/0038280 A1* | 2/2011 | Jung et al. | 370/254 |
| 2011/0038431 A1* | 2/2011 | Frederiksen et al. | 375/259 |
| 2011/0064021 A1* | 3/2011 | Patini | 370/328 |
| 2011/0170480 A1* | 7/2011 | Pi et al. | 370/328 |
| 2012/0028684 A1* | 2/2012 | Miyoshi et al. | 455/561 |
| 2012/0033643 A1* | 2/2012 | Noh et al. | 370/335 |
| 2012/0127939 A1* | 5/2012 | Frederiksen et al. | 370/329 |
| 2012/0243513 A1* | 9/2012 | Fujishima et al. | 370/336 |

OTHER PUBLICATIONS

3GPP TS 36.423 V8.3.0.*

3GPP TS 36.423 V8.1.0.*

R3-080388, 3GPP TSG-RAN WG3#59, Sorrento, Italy, Feb. 11-15, 2008, "Details on Loading Balancing and ICIC Signaling Mechanism", 5 pgs.

Lehser, F., "Self Organising LTE/SAE Network—Operator Requirements & Examples" ITG Fachtagung, Sep. 25, 2006, T-Mobile, 15 pgs.

3GPP TSG-RAN WG3 Meeting #59 R3-080400 Sorrento, Italy, Feb. 11-15, 2008; Load Balancing on X2, (32 pages).

3GPP TSG RAN3#59 R3-080393 Sorrento, Italy Feb. 11-15, 2008; Load balancing scheme and X2 message support, (3 pages).

* cited by examiner

TRANSMITTING NODE B LOAD STATUS INFORMATION IN A SELF ORGANISING NETWORK

FIELD OF THE INVENTION

The present invention relates to an apparatus and in particular but not exclusively for enabling efficient spectral load balancing for a communication system. The present invention also relates to an associated system, computer program and entities.

DESCRIPTION OF RELATED ART

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnected networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include Universal Terrestrial Radio Access Networks (UTRAN) and GSM (Global System for Mobile) EDGE (Enhanced Data for GSM Evolution) Radio Access Networks (GERAN).

A non-limiting example of another type of access architectures is a concept known as the Evolved Universal Terrestrial Radio Access (E-UTRA). This is also known as Long term Evolution UTRA or LTE. An Evolved Universal Terrestrial Radio Access Network (E-UTRAN) consists of E-UTRAN Node Bs (eNBs) which are configured to provide base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices.

In systems providing packet switched connections the access networks are connected to a packet switched core network via appropriate gateways. For example, the eNBs are connected to a packet data core network via an E-UTRAN access gateway (aGW)—these gateways are also known as service gateways (sGW) or mobility management entities (MME).

3GPP long term evolution (LTE) furthermore allows the installation of local area (LA) scenarios where operators may make deployments of low power plug-and-play node Bs, also known as home NB (HNB) and local area NB (LNB). These plug-and-play node Bs can be set up and operated within buildings and offices to provide good quality data coverage. For example a conventional node B located outside the building may have problems reaching the user equipment inside the building due to the physical external walls. In this configuration a LNB located within the building may be in line of sight communication with the user equipment and capable of providing a high data rate communication link.

The LNB may, in order to work fairly with conventional node Bs and other LNBs, be required to implement self organisation network (SON) methods and flexible spectrum use (FSU) methods. Self organisation network (SON) techniques enable the LNB to perform self-tuning and reconfiguration of certain network parameters and structures effecting network operation. Flexible spectrum use (FSU) techniques provide the effective means of utilising and sharing limited available spectrum resources among network systems of the same or different operators operating in overlapping or common spectral and geographic service areas.

The general network architecture proposed involving local area node B deployment is one where several cellular networks using the same radio access technology, for example the E-UTRA technology, is operated by different operators, is deployed in the same geographical area and making use of the same radio spectral resources.

Firstly, in such envisioned deployments of LNB network elements there is the problem of providing network configuration capabilities so that the intercell (i.e. between neighbouring cells) and co-channel interference in individual cells can be overcome or at least partially addressed. This interference and noise between cells and channels is likely to be severe in plug-and-play local area node B deployment as the local area node B elements may be placed physically close to each other. The lack of co-ordination between the LNBs and/or co-ordination between operators can be compared against the traditional network planning used in conventional node B placement where flexible spectral use with low noise interference is designed with respect to the deployment of existing cellular networks.

Furthermore, the local area node B's are potentially deployable quickly and may be temporarily used to assist data reception. Actions such as the initial set-up, reconfiguration, reset or removal of a plug-and-play local area node B deployment must not be allowed to cause a significant impact on the existing operating network environment, in other words, in a communication system it is likely that introducing or removing a local area node B elements may cause a chain reaction of forced network reconfigurations over a large number of cells and not just the immediately neighbouring node B elements in the network around the newly introduced local area network B.

Furthermore, the plug-and-play local area node B elements currently have the problem that they cannot perform spectral load balancing. In conventional node B systems if one node is heavily laden a neighbouring node B can vary the distribution of spectral capacity/users in order to balance spectral loads amongst the node Bs.

Although the current enhanced UTRA standards have self-organising network and load balancing operations between conventional node B (NB) elements using a direct X2 interface to exchange information between the NBs (in particular this information may be a ratio or percentage of the used physical resource blocks (PRBs) for a type of traffic over the total available physical resource blocks (PRBs) in the same direction over a certain time interval). These X2 interfacing methods are documented in the 3GPP publications, R3-080388 "details on load balancing and ICIC signalling mechanism", R3-080400 "load balancing on X2", and R3-080393 "load balancing scheme and X2 message support". These methods however rely on the X2 interface which although being present in conventional NBs is not typically available for local area node Bs in the deployment of plug-and-play LNB elements.

SUMMARY OF INVENTION

Embodiments of the invention aim to at least partially mitigate these problems.

There is provided according to a first aspect of the invention an apparatus configured to: determine for the apparatus at least one spectrum load characteristic; and transmit wirelessly the at least one spectrum load characteristic to a further apparatus.

Thus in embodiments of the invention the neighbouring further apparatus are capable of performing spectral balancing based on the information containing in the spectrum load characteristic values.

The apparatus may be further configured to transmit the at least one spectrum load characteristic to the further apparatus on at least one of: a communication physical layer; a communication control layer.

The apparatus may be further configured to transmit the at least one spectrum load characteristic to the further apparatus within a message comprising a pre-determined user equipment identifier value.

The apparatus may be further configured to determine a user equipment identifier value dependent on at least one of: a spectrum load characteristic type; an apparatus operator value; a spectrum load characteristic measurement period.

The apparatus is preferably at least one of: a wireless communication access node; a local area node B; and a home node B.

The further apparatus is preferably at least one of: a wireless communications access node; a local area node B; a user equipment; a home node B; and a node B.

The at least one spectrum load characteristic may comprise at least one of: physical resource block usage for a guaranteed bit rate data on an uplink communication channel; physical resource block usage for a non real time data on an uplink communication channel; physical resource block usage for a guaranteed bit rate data on a downlink communication channel; and physical resource block usage for a non real time data on a downlink communication channel.

The physical resource block may comprise at least one of: a frequency region block; a time period block; and a spreading code allocation block.

The apparatus may be further configured to: determine for the apparatus at least one spectrum load characteristics over two time periods; transmit the at least one spectrum load characteristic determined over a first time period via a first communication mechanism to the further apparatus; and transmit the at least one spectrum load characteristic determined over a second time period via a second communication mechanism to the further apparatus.

The first time period is preferably shorter than the second time period and the first communication mechanism is preferably the physical layer and the second communication mechanism is preferably the control layer.

According to a second aspect of the invention there is provided an apparatus configured to: receive at least one spectrum load characteristic from at least one further apparatus; and configure the apparatus dependent on the at least one further apparatus spectrum load characteristic.

The apparatus may be further configured to receive the at least one spectrum load characteristic from the further apparatus on at least one of: a communication physical layer; and a communication control layer.

The apparatus may be further configured to receive the at least one spectrum load characteristic from the further apparatus within a message comprising a pre-determined user equipment identifier value.

The apparatus may be further configured to determine from the user equipment identifier value at least one of: a spectrum load characteristic type; an apparatus operator value; and a spectrum load characteristic measurement period.

The further apparatus is preferably at least one of: a wireless communication access node; a local area node B; a home node B; and a user equipment.

The apparatus is preferably at least one of: a wireless communications access node; a local area node B; a home node B; and a node B.

According to a third aspect of the invention there is provided a method for an apparatus comprising: determining for the apparatus at least one spectrum load characteristic; and transmitting the at least one spectrum load characteristic to a further apparatus.

The method may further comprise transmitting the at least one spectrum load characteristic to the further apparatus on at least one of: a communication physical layer; a communication control layer.

The transmitting of the at least one spectrum load characteristic to the further apparatus may comprise transmitting a message comprising a pre-determined user equipment identifier value.

The method may further comprise determining the user equipment identifier value dependent on at least one of: a spectrum load characteristic type; an apparatus operator value; a spectrum load characteristic measurement period.

Determining the at least one spectrum load characteristic may comprise determining at least one of: physical resource block usage for a guaranteed bit rate data on an uplink communication channel; physical resource block usage for a non real time data on an uplink communication channel; physical resource block usage for a guaranteed bit rate data on a downlink communication channel; and physical resource block usage for a non real time data on a downlink communication channel.

The physical resource block may comprise at least one of: a frequency region block; a time period block; and a spreading code allocation block.

Determining for the apparatus at least one spectrum load characteristic comprises: determining the at least one spectrum load characteristic over a first time period; and determining the at least one spectrum load characteristic over second time period, transmitting the at least one spectrum load characteristic comprises: transmitting the at least one spectrum load characteristic determined over the first time period via a first communication mechanism to the further apparatus; and transmitting the at least one spectrum load characteristic determined over the second time period via a second communication mechanism to the further apparatus.

The first time period is preferably shorter than the second time period and the first communication mechanism is preferably the physical layer and the second communication mechanism is preferably the control layer.

According to a fourth aspect of the invention there is provided a method for an apparatus comprising: receiving at least one spectrum load characteristic from at least one further apparatus; and configuring the apparatus dependent on the at least one further apparatus spectrum load characteristic.

The method may further comprise receiving the at least one spectrum load characteristic from the further apparatus on at least one of: a communication physical layer; a communication control layer.

The method may further comprise receiving the at least one spectrum load characteristic from the further apparatus within a message comprising a pre-determined user equipment identifier value.

The method may further comprise determining from the user equipment identifier value at least one of: a spectrum load characteristic type; an apparatus operator value; and a spectrum load characteristic measurement period.

A chipset may comprise the apparatus as discussed above.

According to a fifth aspect of the invention there is provided a computer program product configured to perform a method for an apparatus comprising: determining for the apparatus at least one spectrum load characteristic; and transmitting the at least one spectrum load characteristic to a further apparatus.

According to a sixth aspect of the invention there is provided a computer program product configured to perform a method for an apparatus comprising: receiving at least one spectrum load characteristic from at least one further apparatus; configuring the apparatus dependent on the at least one further apparatus spectrum load characteristic.

According to a seventh aspect of the invention there is provided an apparatus comprising: means for determining for the apparatus at least one spectrum load characteristic; and means for transmitting the at least one spectrum load characteristic to a further apparatus.

According to an eighth aspect of the invention there is provided an apparatus comprising: means for receiving at least one spectrum load characteristic from at least one further apparatus; means for configuring the apparatus dependent on the at least one further apparatus spectrum load characteristic.

BRIEF DESCRIPTION OF FIGURES

For a better understanding of the present invention and as to how the same may be carried into effect, reference will now be made by way of example only to the accompanying drawings in which.

DETAILED DESCRIPTION OF PREFERRED EMBODIMENTS OF THE INVENTION

Figure 1:
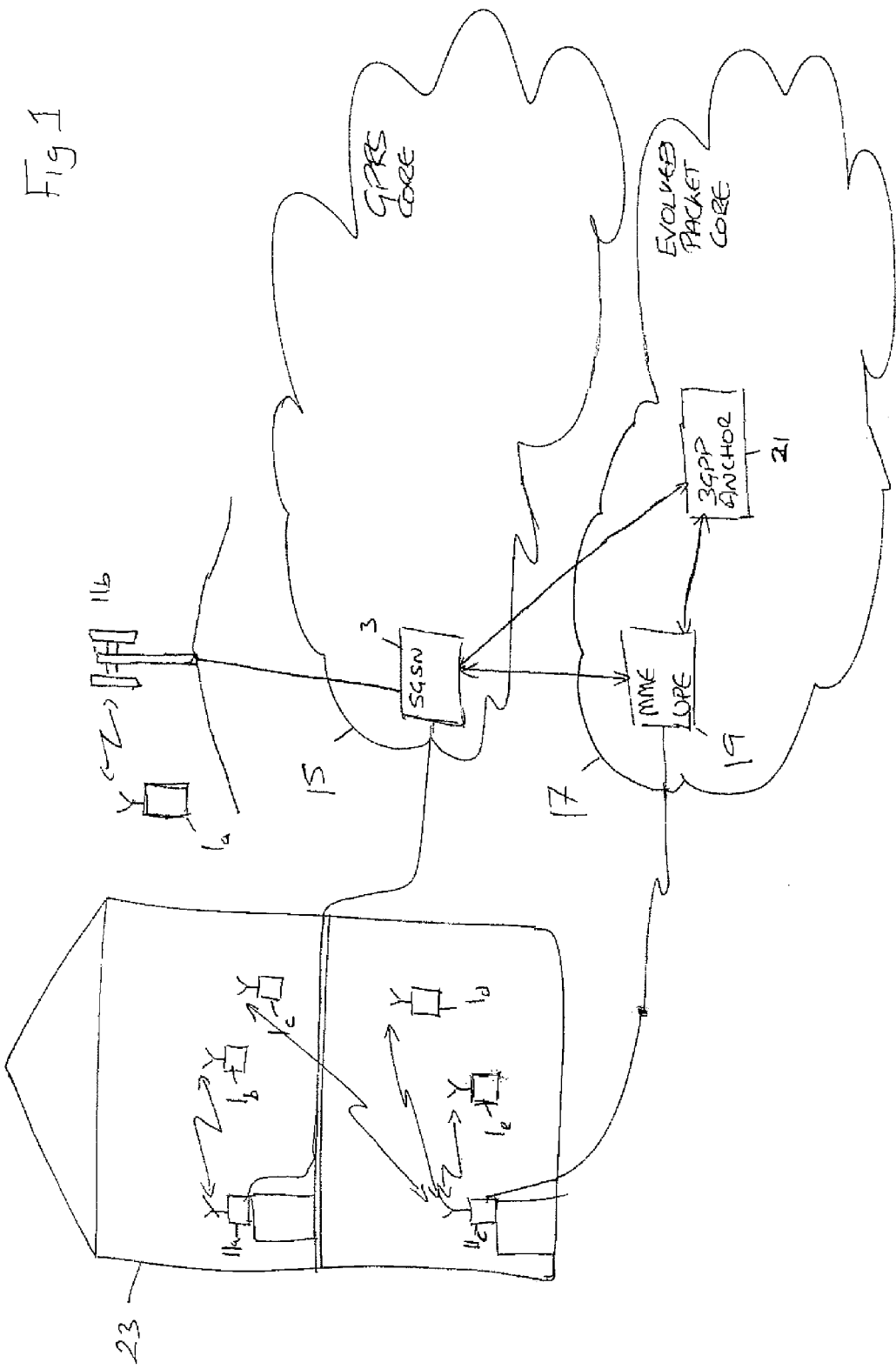
FIG. 1 shows schematically a wireless communications system within which embodiments of the invention may be implemented.

With respect to FIG. 1, a wireless communication system within which embodiments of the invention may be implemented is shown. FIG. 1 shows a conventional node B (NB) 11b which is arranged to communicate with a user device 1. The NB is furthermore configured to be connected to a serving GPRS support node (SGSN) 3. The serving GPRS support node (SGSN) is a network element responsible for the delivery of packet data to and from the mobile stations within a geographical service area via a series of node Bs or enhanced node Bs. The SGSN 3 tasks include packet routing and transfer, mobility management, logical link management and authentication and charging functions. The SGSN 3 is a component of the general packet radio services (GPRS) core 15.

The communication system shown in FIG. 1 furthermore shows a first local area node B 11a, and a further local area node B 11c. As indicated previously the access entities referred to as local area node Bs (LNB) are also known as home node Bs (HNB) and embodiments of the invention as described hereafter may be applied to any other access node capable of implementing the embodiments of the invention described hereafter.

The first local area node B (LNB) 11a is shown located on the first floor of the building 23 and operating in a GPRS network and thus communicating with the serving GPRS support node (SGSN) 3 within the GPRS core 15. The first local area node B 11a is furthermore shown communicating wirelessly with a user equipment (also known as a user device) 1b also located on the first floor of the building 23.

The second local area node B (LNB) 11c is shown located on the ground floor of the building 23. The second local area node B (LNB) 11c is shown operating within a EUTRA network and thus communicates to the mobility management entity (MME) 19. The mobility management entity 19 is a control plane entity which manages the attachment to the network, the authentication of the user equipment 1c, 1d, 1e (which wirelessly communicate with the second local area node B 11c), and interfaces the radio access network for the creation of relevant radio bearers. The MME 19 is shown connected to a 3GPP anchor 21 which according to the network within which embodiments of the invention operate in may be a serving gateway (S-GW) or a packet data network gateway (P-GW).

The mobility management entity 19 and 3GPP anchor 21 are components of the evolved packet core 17. Furthermore the mobility management entity 19 and the 3GPP anchor 21 can further communicate with the SGSN 3 of the GPRS core 15.

As shown with respect to FIG. 1 and the second local area node B 11c, some embodiments of this invention are related to the long term evolution (LTE) version of 3GPP. In the proposed LTE structure the Physical layer is based on SC FDMA (single carrier frequency division multiple access) for the Uplink and OFDMA (orthogonal frequency division multiple access) for the Downlink. However it would be understood by the person skilled in the art that other access technologies and methods may still employ embodiments of the invention.

Figure 2:
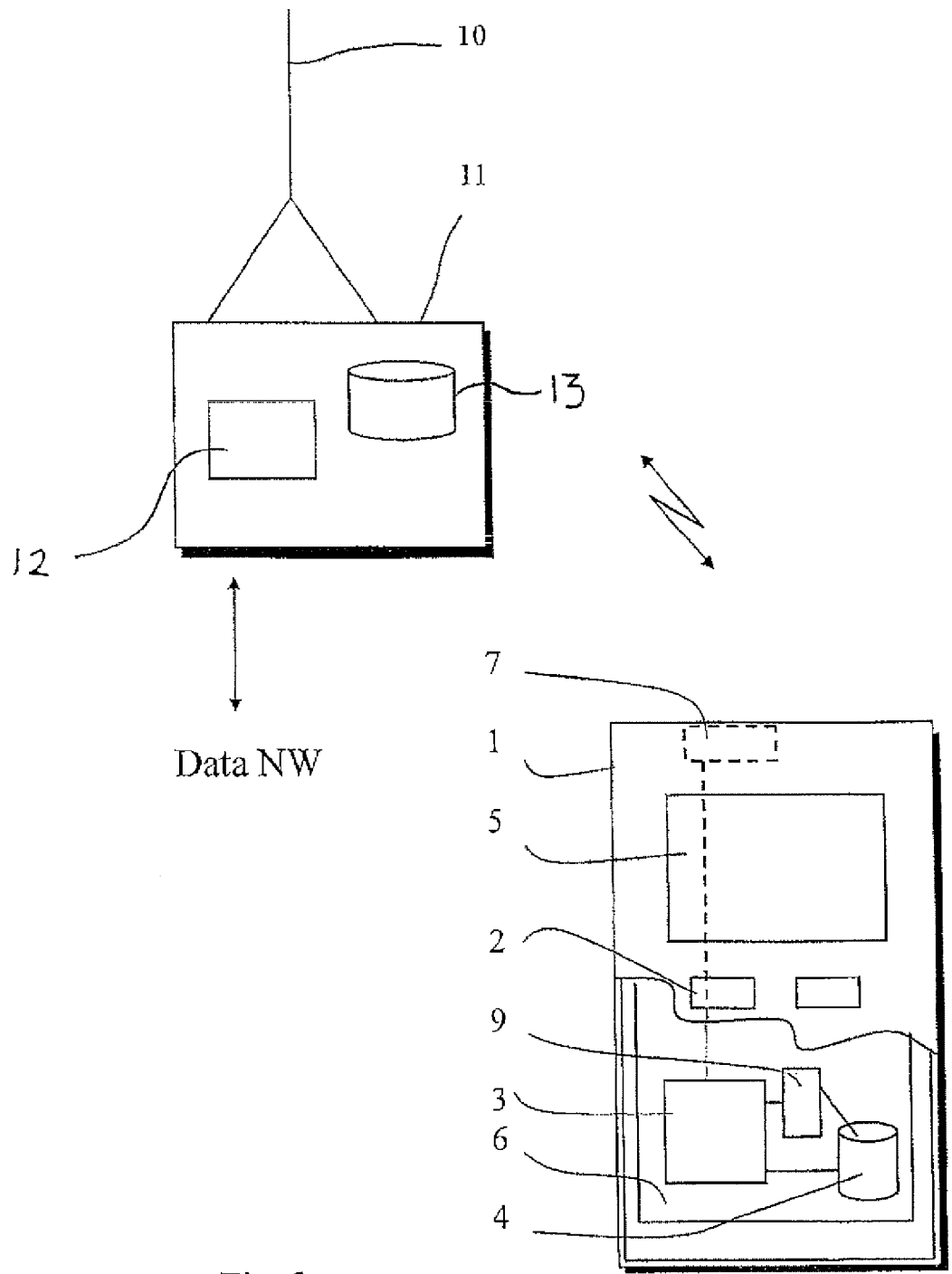
FIG. 2 shows schematically elements of the wireless communications system as shown in FIG. 1 in further detail.

Embodiments of the invention may be implemented as a part of a long term evolution (LTE) radio system. Therefore the non-limiting example of FIG. 2 shows in further detail the local area node B 11c and an user equipment configured to be in wireless communication with the local area node B 11c. This system shown in FIG. 2 provides an evolved radio access system that is connected to a packet data system. Such an access system may be provided, for example, based on architecture that is known from the Evolved Universal Terrestrial Radio Access (E-UTRA) and based on use of the Evolved Universal Terrestrial Radio Access Networks (E-UTRAN) local area Node Bs (LNB) 11c. The Evolved Universal Terrestrial Radio Access Network (E-UTRAN) consists of a local area Node B (LNB) 11c which is configured to provide base station and control functionalities. For example, the LNB node can provide independently radio access network features such as user plane radio link control/medium access control/physical layer protocol (RLC/MAC/PHY) and control plane radio resource control (RRC) protocol terminations towards the user equipment.

Although the embodiments described below describe a system incorporating various different technology node Bs, such as GPRS and E-UTRAN, other embodiments of the invention may be implemented where the node Bs all use the same or slight variants of the same access technology but implemented by different operators.

It is noted that FIG. 2 shows this architecture only to give an example of a possible communication system where the embodiments described below may be provided and that other arrangements and architectures are also possible. For example, the user equipment may communicate with a different access system, such as GPRS via a GPRS access device, for example the first LNB 11a.

The E-UTRA LNB 11c has an antenna 10 for communicating with the user equipment 1 via wireless link. The E-UTRA LNB 11c has a data processing entity for carrying out various processes. Additionally a memory 13 is provided which stores information which is used by the E-UTRA LNB 11c.

In embodiments of the invention, an LNB may also communicate with other LNB(s) nearby over the air or wirelessly, regardless of whether they belong to the same network or a different operator's network.

The user equipment 1 can be used for various tasks such as making and receiving phone calls, for receiving and sending data from and to a data network and for experiencing, for example, multimedia or other content. For example, a user device may access data applications provided via a data network. For example, various applications may be offered in a data network that is based on the Internet Protocol (IP) or any other appropriate protocol. An appropriate user device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like.

The mobile device may communicate via an appropriate radio interface arrangement of the mobile device. The interface arrangement may be provided for example by means of a radio part 7 and associated antenna arrangement. The antenna arrangement may be arranged internally or externally to the mobile device.

A mobile device is typically provided with at least one processing entity 3 and at least one memory 4 for use in tasks it is designed to perform. The data processing and storage entities can be provided on an appropriate circuit board and/or in chipsets. This feature is denoted by reference 6.

FIG. 2 shows further a modulator component 9 connected to the other elements. It is noted that the modulator functions may be arranged to be provided by the data processing entity 3 instead of a separate component.

The user may control the operation of the user equipment by means of a suitable user interface such as key pad 2, voice commands, touch sensitive screen or pad, combinations thereof or the like. A display 5, a speaker and a microphone are also typically provided. Furthermore, a user equipment may comprise appropriate connectors (either wired or wireless) to other devices and/or for connecting external accessories, for example hands-free equipment, thereto.

In the proposed LTE structure, the physical layer details are as follows. The generic radio frame for FDD (frequency division duplex) and TDD (time division duplex) has a duration of 10 ms and consists of 20 slots with a slot duration of 0.5 ms. Two adjacent slots form one sub-frame of length 1 ms. A resource block spans either 12 sub-carriers with a sub-carrier bandwidth of 15 kHz or 24 sub-carriers with a sub-carrier bandwidth of 7.5 kHz each over a slot duration of 0.5 ms.

The physical channels defined in the downlink are the Physical Downlink Shared Channel (PDSCH), the Physical Downlink Control Channel (PDCCH) and the Common Control Physical Channel (CCPCH). The physical channels defined in the uplink are the Physical Uplink Shared Channel (PUSCH) and the Physical Uplink Control Channel (PUCCH).

The channel coding scheme for transport blocks in LTE is Turbo Coding. Trellis termination is used for the turbo coding. Each radio frame is long and consists of 20 slots of length 0.5 ms, numbered from 0 to 19.

Some embodiments of the invention are related to the control channel structure in the context of the FDD mode of 3GPP. However, it should be appreciated that embodiments of the invention may also be applied to the TDD mode as well, since the concept of creating control channels for the TDD mode uses similar principles.

As discussed, the general control channel structure is such that there will be a division between control and data, such that these are using time domain multiplexing (meaning that a number of OFDM symbols in each TTI (transmission time interval) will carry the control channels for a number of UE (PDCCH), and a set of OFDM symbols will carry the shared channel for a number of users (PDSCH)).

Figure 3:
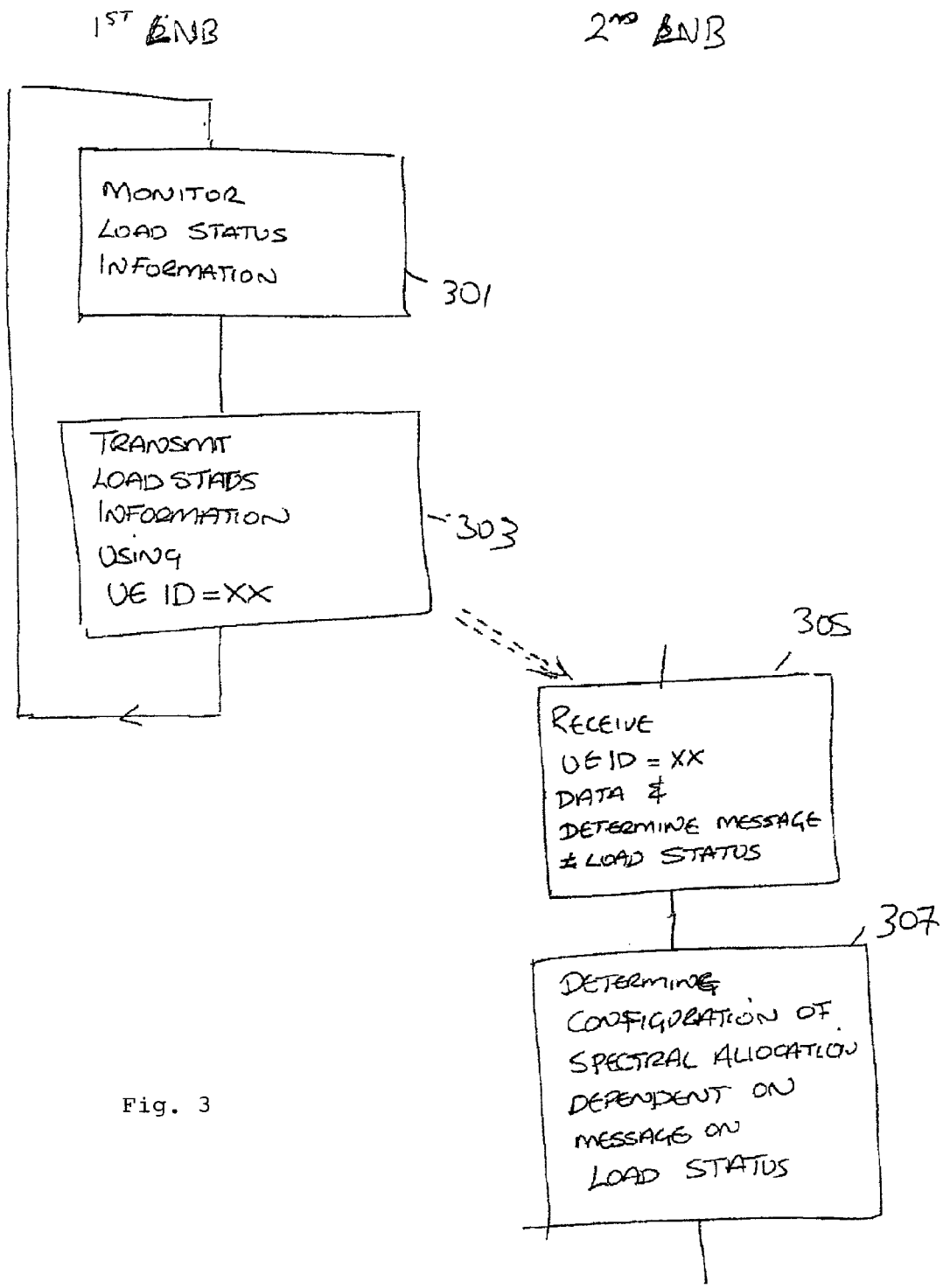
FIG. 3 shows a flow diagram illustrating an embodiment of the invention.

With respect to FIG. 3 we describe how local area node B elements, for example the E-UTRA LNB 11c in embodiments of the invention implements self-organising network and flexible spectral use operations.

In the first step, the E-UTRA LNB 11c monitors the load status information for the cell.

The load status information may in a first embodiment of the invention include at least one of the following measurements.

1. Physical resource block usage for guaranteed bit rate (GBR) on the uplink channels. In other words, the E-UTRA LNB 11c performs monitoring of the real time traffic on physical resource block (PRB) usage from the user equipment 1 to the LNB. The physical resource block (PRB) may be a frequency block where the LNB communicates using frequency division duplexing (FDD). In embodiments of the invention where a LNB communicates with the user equipment using time division duplexing (TDD), the physical resource blocks monitored may be timeslots. In some embodiments of the invention, where the LNB communicates with the user equipment using code division multiple access (CDMA), the physical resource block (PRB) monitored may be the spreading codes.

The guaranteed bit rate (real time traffic) data defines a class of data which indicates that the data is delay sensitive. Examples of data which would typically be classified as guaranteed bit rate (or real time traffic) include streaming video data, streaming audio data, voice communication data, and real time information data.

2. Physical resource block (PRB) usage for non real time data traffic on the uplink. In other words the local area node B monitors the load status of data received from the user equipment 1 which is not particularly time sensitive. Non real time traffic class data would, for example, include www browsing data.

3. Physical resource block (PRB) usage for guaranteed bit rate (real time) traffic on the downlink. This is a similar measurement to the guaranteed bit rate traffic on the uplink, but transmitted from the LNB 11 to the mobile device 1.

4. Physical resource block (PRB) usage for non real time traffic on the downlink. This is similar to the monitoring of the physical resource block usage for non-guaranteed bit rate (real time) traffic in the uplink, but is for data traffic being transmitted from the LNB 11 to the mobile device 1.

In an embodiment of the invention the monitoring defines a ratio or percentage of the physical resource block usage for a type of traffic over the available physical resource blocks in the same transmission direction over a specific time interval and for a specific local area node B cell. In these embodiments any non-scheduled transmissions and retransmissions are also counted as being used.

In some embodiments of the invention the spectrum load status information is monitored and reported over more than one time period. Thus in some embodiments of the invention the LNB specific traffic load status may be monitored for a short-term spectrum load status report, a mid-term spectrum load status report, and a long-term spectrum load status report.

The short-term traffic status monitoring period may, for example, estimate the load condition over a time period of tens or hundreds of milliseconds. The mid-term spectrum load status monitoring period may determine the usage of the radio band resource blocks over a time period which may be from hundreds of milliseconds to seconds in length. The long-term spectrum load status monitoring period may be from seconds up to minutes.

In some embodiments of the invention the spectrum load status information monitored includes the monitoring of interference conditions specific to certain radio band resource (RBR) blocks of the allocated spectrum or overall system bandwidth. In other words, the LNB generates a report based on the monitoring of each physical resource block (PRB) separately or of groups of physical resource blocks (for example where the groups of PRBs are likely to have interference) rather than generating a report based on monitoring all physical resource blocks together.

For example, if in embodiments of the invention as the overall system bandwidth is 100 MHz and is divided into PRBs. Each PRB may comprise 12 sub-carriers, each sub-carrier being spaced by 15 kHz, so that each PRB may have a bandwidth of 180 kHz. Then in such an embodiment different monitoring reports can be determined by monitoring a group of resource blocks by combining or pooling a number of the radio band resource blocks.

In some embodiments of the invention, the spectrum load status information includes classification of load information based on whether the spectral usage is sharable or not between operators. In these embodiments the monitoring of the load status information includes monitoring whether or not the available spectral bandwidth is sharable and with whom the bandwidth is sharable.

In some embodiments of the invention the monitored spectrum load status information further includes combining the monitored spectrum load status information described above to produce an integer value representing a general load value. For example in embodiments the E-UTRA LNB 11c generates a whole number value on the scale from 1 to 10 which would indicate the specified load level of the E-UTRA LNB cell. This load level value for the E-UTRA LNB cell may be generated from combinations of: the spectrum load sensing as mentioned above, radio measurements, the actual spectrum load, and monitored performance measures. In some embodiments of the invention, this index value can be produced for each radio band resource block i.e. groups of physical resource blocks, and such an index measured for each RBR block on a block by block basis. An RBR is a set of contiguous PRBs.

The monitoring of the load status information is shown in FIG. 3 by step 301.

The E-UTRA LNB 11c then transmits the load status information to neighbouring local area node B elements 11a and other neighbouring node B elements 11b. In a first embodiment of the invention the load status information described above is transmitted using a special "cell load broadcast" user equipment ID.

In other words the E-UTRA local area node B 11c transmits the load information to the neighbouring LNBs and NBs by pretending to be a predefined user equipment with a predefined user equipment ID value. These embodiments allow the LNBs in question to use other channel type(s) than the broadcast channel to send the spectrum load status information and so that active UEs can receive the spectrum load information at anytime and thus need not have to switch the node B to listen to the broadcast channel for specific messages.

Furthermore in these embodiments of the invention the neighbouring LNBs and NBs within the coverage area of the cell of interest may receive the information received on this predefined user equipment ID value and know that data associated with this ID value contains the load information monitored by the neighbouring LNB.

In some embodiments of the invention the E-UTRA local area node B 11c initially transmits a message with a specific user equipment ID value which may be received by the neighbouring local area node Bs and NBs. The information sent initially to the neighbouring LNB and NBs indicates that this user equipment ID value will be used to push or advertise the information of the E-UTRA LNB cell load.

In some embodiments of the invention the user equipment in used is predefined and is specific to an operator. Thus in embodiments of the invention any neighbouring LNB or NB which receives a data packet with a specific user equipment ID value knows that the information contained within the data may contain traffic information and also that the traffic information is that from a specific operator.

Furthermore in some embodiments of the invention the cell load broadcast user equipment identification value used, defines the type of information contained. For example in embodiments of the invention, the long term status information may be transmitted with a first user equipment ID value and the short and mid-term status information transmitted with a second and third UE ID value.

In such embodiments where the UE ID is operator specific or even cell specific, the UE ID values may be in further embodiments advertised using the information in the broadcast system information on the broadcast control channel (BCCH).

In some embodiments of the invention, different LNB traffic status information is transmitted via different transmission mechanisms.

In the embodiments described above the cell load information is transmitted using the physical layer. However in some embodiments of the invention the mid and/or long-term cell load status information reports may be transmitted using the broadcast control channel (BCCH) using the radio resource control layer (also known as layer 3) procedure. In these embodiments of the invention where the BCCH is used to transmit the spectrum load information no UE ID value is required.

In some embodiments of the invention, the updating and broadcast intervals for the information reports may be different dependent on the load status report element being reported.

Furthermore in some embodiments of the invention while the longer term traffic data is transmitted using the radio resource control layer and avoiding using valuable data capacity the mid and/or short term load status information is transmitted using the physical layer (also known as layer 1) in order that the communications network can quickly perform self organization without having to wait for the slower control mechanism route for reconfiguration.

In these embodiments of the invention the mid and/or short-term spectrum load information is reported in a similar fashion as that of a user equipment reporting a channel quality indicator (CQI).

In some embodiments of the invention the spectrum load status information items and related configuration and control parameters, for example, channel formats and updating or scheduling time intervals may be triggered and set dependent on the cell load status (provided from the monitoring of the load status information carried out in the previous step). In this way the broadcasting trigger can be altered in a semi-static fashion.

Furthermore in some embodiments of the invention the distribution of the transmission of the load status information can be co-ordinated amongst the various LNBs. For example on activation of a new local area node B the new LNB is configured to first listen and detect its neighbour load status information from neighbouring LNBs and then, adjust its own monitoring, and transmitting configuration accordingly to its detectable neighbours to ensure sufficient cell spectrum load indication messages can be transmitted to the relevant neighbour local area node Bs.

In some embodiments of the invention, the local area node B communicates to other local area node Bs not directly but via a user equipment which initially receives the traffic status information message from a first local area node B and then reports the traffic status information to the second local area node B. In some embodiments of the invention this cell load status information from the first node B is transmitted to the serving node B of the user equipment using the available bandwidth of the user equipment radio measurement and reporting mechanism.

The transmission of the load status information is shown in FIG. 3 by step 303.

In order to more fully understand the invention, the reception of the load status information is shown with respect to a second local area node B. Firstly the second local area node B receives the message with the specific user equipment ID value (UE ID=XX). The second local area node B determines that this is the user equipment ID value which specifies that the message data contains the load status information. The second local area node B then extracts the message load status information.

The receipt and extraction of the load status information is shown in FIG. 3 by step 305.

The second node B then uses this load status information to determine the configuration of the spectral allocation dependent on the message. The self-organisation network determining the configuration of the spectral allocation—in other words the flexible spectrum use method used may be any of the methods known in the art capable of handling the type of load status information received. Thus where in embodiments of the invention the load status information contains such information as the physical resource block usage in uplink and downlink channels in guaranteed bit rate or non real traffic, or any one of these combinations, the configuration of spectral allocation may be made according to the SON or FSU techniques currently described with regards to the long-term evolution of 3GPP in release 8 of LTE.

Thus, using embodiments of the invention as described the local area node B can overcome the lack of a direct X2 interface which enables the flexible spectral usage configuration techniques in conventional node Bs and enables the local area node Bs to more optimally allocate their available channel selections to more equitably allocate communication channels according to load and interference values.

It should be appreciated that although the preferred embodiments of the invention have been described in the context of the LTE proposals, embodiments of the present invention may be used within the framework provided by any other standard whether it has proposed or has yet to be evolved. Embodiments of the invention may also be used in scenarios where there is no standardized framework. Accordingly references to an LNB should be considered to be equally applicable to a base station or a control entity.

In the above described embodiments various numbers have been given for various parameters and characteristics. However, these are by way of example and in different scenarios and/or as a result of the changes to standard specifications different values can be used.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   at least one data processor; and
   at least one memory including computer program code, the at least one memory and the computer program code configured, with the at least one data processor, to cause the apparatus to perform at least the following:
   determine for the apparatus at least one spectrum load characteristic, the apparatus comprising a first wireless network access node; and
   transmit wirelessly the at least one spectrum load characteristic to a further apparatus that comprises at least one second wireless network access node, the at least one spectrum load characteristic being transmitted within a message comprising a pre-determined user equipment identifier value such that the message is indicated as originating from a user equipment having the pre-determined user equipment identifier value,
   wherein said first wireless network access node and said second wireless network access node do not communicate with one another using an X2 interface, and wherein said first wireless network access node is not a user equipment.

2. The apparatus as claimed in claim 1, wherein the at least one memory and the computer program code are further configured, with the at least one data processor, to transmit the at least one spectrum load characteristic to the further apparatus on at least one of:
   a wireless network access node-user equipment communication physical layer; and
   a wireless network access node-user equipment communication control layer.

3. The apparatus as claimed in claim 1, where the pre-determined user equipment identifier value is one that is pre-determined to indicate that data in the message contains the at least one spectrum load characteristic that was determined by the first wireless network access node.

4. The apparatus as claimed in claim 3, wherein the at least one memory and the computer program code are further configured, with the at least one data processor, to determine a user equipment identifier value dependent on at least one of:
   a spectrum load characteristic type;
   an apparatus operator value; and
   a spectrum load characteristic measurement period.

5. The apparatus as claimed in claim 1, wherein the apparatus is at least one of:
   a local area node B; and
   a home node B.

6. The apparatus as claimed in claim 1, wherein the further apparatus is at least one of:
   a local area node B;
   a user equipment;
   a home node B; and
   a node B.

7. The apparatus as claimed in claim 1, wherein the at least one spectrum load characteristic comprises at least one of:
   physical resource block usage for a guaranteed bit rate data on an uplink communication channel;
   physical resource block usage for a non real time data on an uplink communication channel;
   physical resource block usage for a guaranteed bit rate data on a downlink communication channel; and
   physical resource block usage for a non real time data on a downlink communication channel.

8. The apparatus as claimed in claim 7 wherein the physical resource block comprises at least one of:
   a frequency region block;
   a time period block; and
   a spreading code allocation block.

9. The apparatus as claimed in claim 1, wherein the at least one memory and the computer program code are further configured, with the at least one data processor, to:
   determine for the apparatus at least one spectrum load characteristic over two time periods;
   transmit the at least one spectrum load characteristic determined over a first time period via a first communication mechanism to the further apparatus; and
   transmit the at least one spectrum load characteristic determined over a second time period via a second communication mechanism to the further apparatus.

10. The apparatus as claimed in claim 9, wherein the first time period is shorter than the second time period and the first communication mechanism is a wireless network access node-user equipment communication physical layer and the second communication mechanism is a wireless network access node-user equipment communication control layer.

11. An apparatus comprising:
    at least one data processor; and
    at least one memory including computer program code, the at least one memory and the computer program code configured, with the at least one data processor, to cause the apparatus to perform at least the following:
    receive at the apparatus, said apparatus comprising a first wireless network access node, at least one spectrum load characteristic determined by a further apparatus that comprises at least one second wireless network access node, the at least one spectrum load characteristic being received within a message comprising a pre-determined user equipment identifier value such that the message is indicated as originating from a user equipment having the pre-determined user equipment identifier value; and
    configure the apparatus dependent on the at least one received spectrum load characteristic,
    wherein said first wireless network access node and said second wireless network access node do not communicate with one another using an X2 interface, and wherein said first wireless network access node is not a user equipment.

12. The apparatus as claimed in claim 11, wherein the at least one memory and the computer program code are further configured, with the at least one data processor, to receive the at least one spectrum load characteristic from the further apparatus on at least one of:
    a wireless network access node-user equipment communication physical layer; and
    a wireless network access node-user equipment communication control layer.

13. The apparatus as claimed in claim 11, where the pre-determined user equipment identifier value is one that is pre-determined to indicate that data in the message contains the at least one spectrum load characteristic that was determined by the second wireless network access node.

14. The apparatus as claimed in claim 13, wherein the at least one memory and the computer program code are further configured, with the at least one data processor, to determine from the user equipment identifier value at least one of:
   a spectrum load characteristic type;
   an apparatus operator value; and
   a spectrum load characteristic measurement period.

15. The apparatus as claimed in claim 11, wherein the further apparatus is at least one of:
   a local area node B;
   a home node B; and
   a user equipment.

16. The apparatus as claimed in claim 11, wherein the apparatus is at least one of:
   a local area node B;
   a home node B; and
   a node B.

17. A method comprising:
   determining for an apparatus at least one spectrum load characteristic, the apparatus comprising a first wireless network access node; and
   transmitting the at least one spectrum load characteristic from the apparatus to a further apparatus that comprises at least one second wireless network access node,
   wherein the step of transmitting transmits the at least one spectrum load characteristic within a message comprising a pre-determined user equipment identifier value such that the message is indicated as originating from a user equipment having the pre-determined user equipment identifier value,
   wherein said first wireless network access node and said second wireless network access node do not communicate with one another using an X2 interface, and wherein said first wireless network access node is not a user equipment.

18. The method as claimed in claim 17, where the step of transmitting transmits the at least one spectrum load characteristic to the further apparatus on at least one of:
   a wireless network access node-user equipment communication physical layer; and
   a wireless network access node-user equipment communication control layer.

19. The method as claimed in claim 17, where the pre-determined user equipment identifier value is one that is pre-determined to indicate that data in the message contains the at least one spectrum load characteristic that was determined by the first wireless network access node.

20. The method as claimed in claim 19, further comprising determining the user equipment identifier value dependent on at least one of:
   a spectrum load characteristic type;
   an apparatus operator value; and
   a spectrum load characteristic measurement period.

21. The method as claimed in claim 17, wherein determining the at least one spectrum load characteristic comprises determining at least one of:
   physical resource block usage for a guaranteed bit rate data on an uplink communication channel;
   physical resource block usage for a non real time data on an uplink communication channel;
   physical resource block usage for a guaranteed bit rate data on a downlink communication channel; and
   physical resource block usage for a non real time data on a downlink communication channel.

22. The method as claimed in claim 21, wherein the physical resource block comprises at least one of:
   a frequency region block;
   a time period block; and
   a spreading code allocation block.

23. The method as claimed in claim 17, wherein determining for the apparatus at least one spectrum load characteristic comprises:
   determining the at least one spectrum load characteristic over a first time period; and
   determining the at least one spectrum load characteristic over a second time period, and wherein transmitting the at least one spectrum load characteristic comprises:
   transmitting the at least one spectrum load characteristic determined over the first time period via a first communication mechanism to the further apparatus; and
   transmitting the at least one spectrum load characteristic determined over the second time period via a second communication mechanism to the further apparatus.

24. The method as claimed in claim 23, wherein the first time period is shorter than the second time period and the first communication mechanism is a wireless network access node-user equipment physical layer and the second communication mechanism is a wireless network access node-user equipment control layer.

25. A method comprising:
   receiving at an apparatus, said apparatus comprising a first wireless network access node, at least one spectrum load characteristic determined by a further apparatus that comprises at least one second wireless network access node, the at least one spectrum load characteristic being received within a message comprising a pre-determined user equipment identifier value such that the message is indicated as originating from a user equipment having the pre-determined user equipment identifier value; and
   configuring the apparatus dependent on the at least one received spectrum load characteristic,
   wherein said first wireless network access node and said second wireless network access node do not communicate with one another using an X2 interface, and wherein said first wireless network access node is not a user equipment.

26. The method as claimed in claim 25, further comprising receiving the at least one spectrum load characteristic from the further apparatus on at least one of:
   a wireless network access node-user equipment communication physical layer; and
   a wireless network access node-user equipment communication control layer.

27. The method as claimed in claim 25, where the pre-determined user equipment identifier value is one that is pre-determined to indicate that data in the message contains the at least one spectrum load characteristic that was determined by the second wireless network access node.

28. The method as claimed in claim 27, further comprising determining from the user equipment identifier value at least one of:
   a spectrum load characteristic type;
   an apparatus operator value; and
   a spectrum load characteristic measurement period.

29. A chipset comprising an apparatus as claimed in claim 1.

30. A chipset comprising an apparatus as claimed in claim 11.

31. A computer program product comprising a non-transitory computer readable storage medium bearing computer program code embodied therein for use with a computer, the computer program code comprising code for performing a method comprising:
- determining for an apparatus at least one spectrum load characteristic, the apparatus comprising a first wireless network access node; and
- transmitting the at least one spectrum load characteristic from the apparatus to a further apparatus that comprises at least one second wireless network access node,
- wherein the step of the method of transmitting transmits the at least one spectrum load characteristic within a message comprising a pre-determined user equipment identifier value such that the message is indicated as originating from a user equipment having the pre-determined user equipment identifier value,
- wherein said first wireless network access node and said second wireless network access node do not communicate with one another using an X2 interface, and wherein said first wireless network access node is not a user equipment.

32. A computer program product comprising a non-transitory computer readable storage medium bearing computer program code embodied therein for use with a computer, the computer program code comprising code for performing a method comprising:
- receiving at an apparatus comprising a first wireless network access node at least one spectrum load characteristic determined by a further apparatus that comprises at least one second wireless network access node, the at least one spectrum load characteristic being received within a message comprising a pre-determined user equipment identifier value such that the message is indicated as originating from a user equipment having the pre-determined user equipment identifier value; and
- configuring the apparatus dependent on the at least one received spectrum load characteristic,
- wherein said first wireless network access node and said second wireless network access node do not communicate with one another using an X2 interface, and wherein said first wireless network access node is not a user equipment.

33. An apparatus comprising:
- means for determining for the apparatus at least one spectrum load characteristic, the apparatus comprising a first wireless network access node; and
- means for transmitting wirelessly the at least one spectrum load characteristic to a further apparatus that comprises at least one second wireless network access node, the at least one spectrum load characteristic being transmitted within a message that comprises a pre-determined user equipment identifier value such that the message is indicated as originating from a user equipment having the pre-determined user equipment identifier value,
- wherein said first wireless network access node and said second wireless network access node do not communicate with one another using an X2 interface, and wherein said first wireless network access node is not a user equipment.

34. An apparatus comprising;
- means for receiving at the apparatus comprising a first wireless network access node at least one spectrum load characteristic determined by a further apparatus that comprises at least one second wireless network access node, the at least one spectrum load characteristic being received within a message comprising a pre-determined user equipment identifier value such that the message is indicated as originating from a user equipment having the pre-determined user equipment identifier value; and
- means for configuring the apparatus dependent on the at least one received spectrum load characteristic,
- wherein said first wireless network access node and said second wireless network access node do not communicate with one another using an X2 interface, and wherein said first wireless network access node is not a user equipment.

* * * * *